United States Patent [19]

Henkel

[11] Patent Number: 4,670,700
[45] Date of Patent: Jun. 2, 1987

[54] BATTERY CHARGERS FOR SECONDARY CELLS, AND OR BATTERIES

[75] Inventor: John R. Henkel, Davenport, Iowa

[73] Assignee: Exciter Battery & Electric Company, Inc., Davenport, Iowa

[21] Appl. No.: 773,850

[22] Filed: Sep. 9, 1985

Related U.S. Application Data

[63] Continuation-in-part of Ser. No. 701,101, Feb. 13, 1985, abandoned.

[51] Int. Cl.[4] ............................................. H02J 7/10
[52] U.S. Cl. ......................................... 320/2; 320/3; 320/51
[58] Field of Search ....................... 320/2–7, 320/15, 51, 57; 323/906

[56] References Cited

U.S. PATENT DOCUMENTS

| 1,445,025 | 2/1923 | McFarland | 320/6 |
| 3,005,943 | 10/1961 | Jaffe | 320/15 X |
| 3,825,740 | 7/1974 | Friedman et al. | 320/3 X |
| 4,311,952 | 1/1982 | Mabuchi et al. | 320/3 |
| 4,422,031 | 12/1983 | Vigerstøl | 320/2 |

FOREIGN PATENT DOCUMENTS

| 226070 | 12/1924 | United Kingdom | 320/15 |
| 604094 | 6/1948 | United Kingdom | 323/906 |

Primary Examiner—R. J. Hickey
Attorney, Agent, or Firm—Laff, Whitesel, Conte & Saret

[57] ABSTRACT

A battery charger for a nickel-cadmium cell, or the like, uses a large battery, such as an acid-lead automobile battery. Electrodes depend from the fill caps and into the electrolyte to make a plurality of potential points. Each of the cells in the large battery includes two sets of plates, with the individual plates in each set being joined at one end by a common bus bar. A terminal extends from each of these bus bars through the case of the acid-lead battery, to provide another plurality of potential points. A small battery, such as at least one nickel-cadmium cell is coupled to selected ones of the potential points so that the potential across the selected potential points equalizes with the potential of the small battery.

12 Claims, 13 Drawing Figures

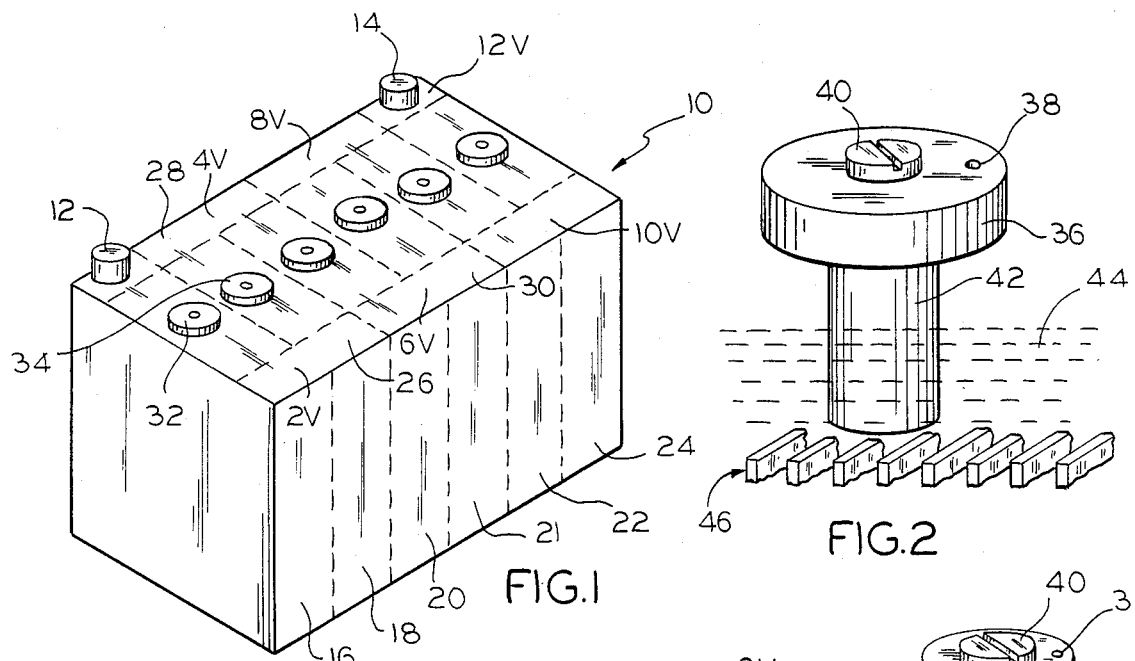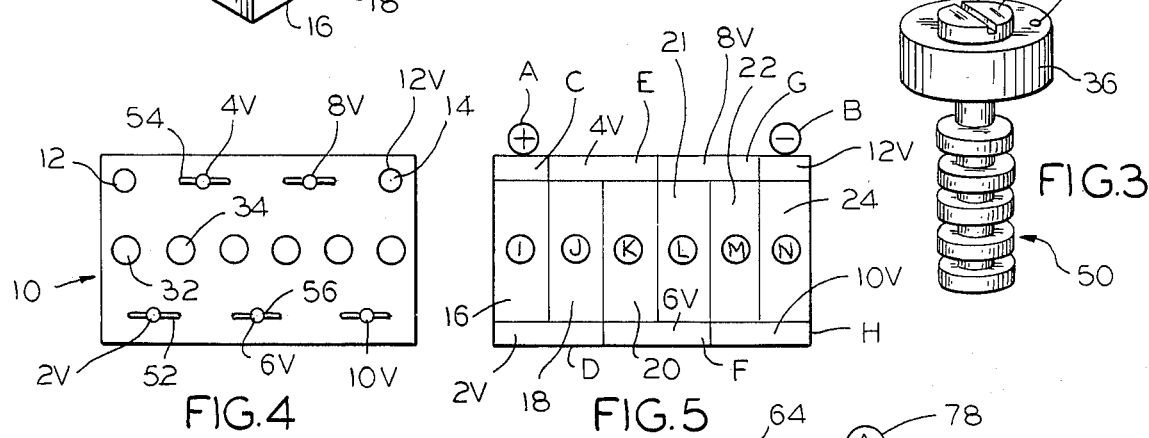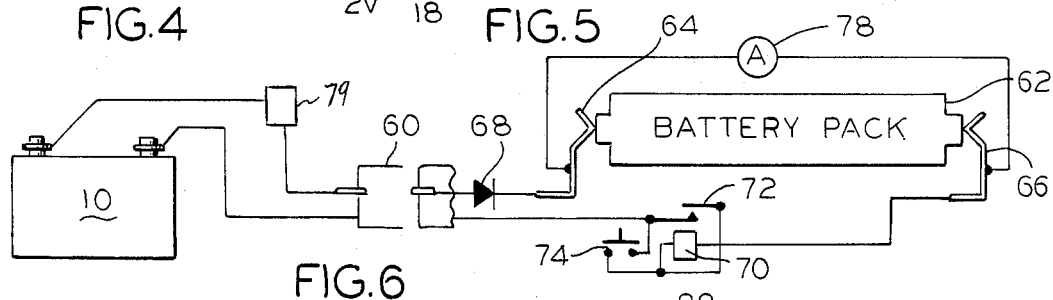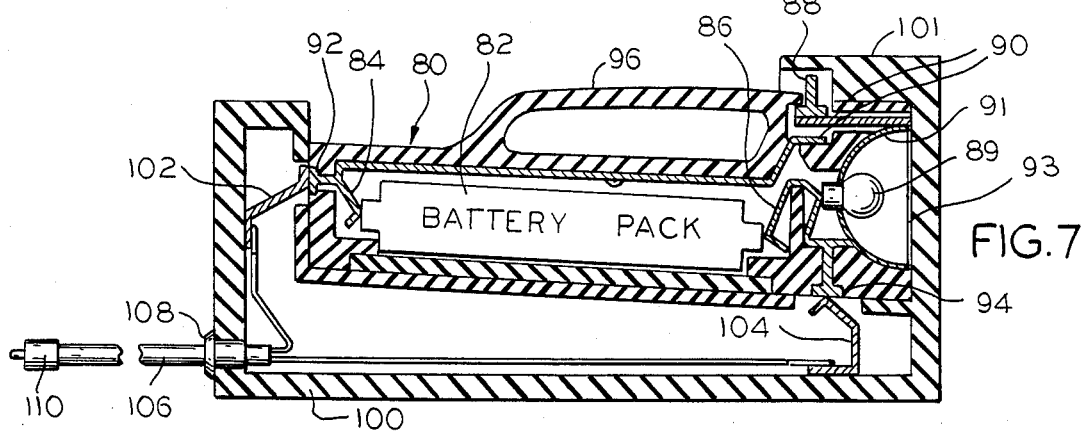

4,670,700

1

BATTERY CHARGERS FOR SECONDARY CELLS, AND OR BATTERIES

This is a continuation-in-part of U.S. Ser. No. 701,101, filed Feb. 13, 1985 now abandoned.

This invention relates to battery chargers and, more particularly—but not necessarily exclusively—to chargers for secondary cells, especially high quality secondary cells, such as nickel-cadmium or nickel iron batteries.

As used herein, a "secondary battery" or cell is a battery that can be recharged. The term "large battery" means one which may be charged repeatedly. When so charged, it has stored energy which may be paid out over a substantial period of time. A lead-acid, automobile battery is one of many examples of a "large battery". The term "small battery" means one which may be directly charged by the voltage of the large battery and one which requires much less than the energy stored in the large batters in order to reach a full charge. A nickel-cadmium battery is one of many examples of both a small battery and a secondary battery or cell.

In general, known battery chargers are rectifiers connected to a.c. power. These chargers may charge the secondary cells with a constant charging current, a quasi-constant charging current, a trickle charging current, or a step charging current which reduces through successive steps as a full charge approaches. In the traditional charger, brute force is used to drive electrons into a low charged or dead battery under some kind of preconceived schedule, like so many rifle bullets being fired at a target, without consideration of whether the battery can accept the electrons or of variations caused by random events, differences between batteries, or the like. Therefore, care must be taken so that the charger will have a carefully controlled current, well regulated voltages, and the like. As a result, most of the secondary cells must be charged for extended periods of time, such as 15–20 hours, with many safety precautions.

It is thought that many of the limitations which have caused battery chargers to requires these precautions results from the use of a.c. to power the charger and of the brute force approach of trying to make the charged battery conform to a preconceived norm. Regardless of the procedures used to rectify and smooth the voltages, there is almost certainly a residual ripple which tends to cycle the battery being charged. As this happens, the internal resistance of the battery being charged begins to generate heat and, if no care is taken, the battery may be damaged or destroyed. It is also thought that merely driving a charging current into a battery without any relationship as to how rapidly the individual battery can absorb the charge, leads to a heating of the battery.

There are presently on the market, flashlights and battery packs that can be recharged through the cigarette lighter of an automobile. However, they have nothing more than a resistor to reduce the voltage. With this system, charging has to be watched or timed. Otherwise, the battery may go into overcharge and be destroyed. Or, it is necessary to have a charge terminating device, such as a thermostate, etc. to terminate charging. The battery may be harmed by a use of a thermostat, etc. to terminate charging because the heat which operates the thermostat is generated after an overcharge situation has occurred.

2

Accordingly, an object of the invention is to provide new and improved battery chargers, especially secondary battery chargers. Here, an object is to eliminate problems caused by a.c. ripple in rectified current and problems caused by treating every battery as if it were identical to every other battery.

Another object of the invention is to provide battery chargers which use readily available components.

In keeping with an aspect of the invention, a large battery is used to provide a stable source d.c. charging current. The large battery may be fully charged from any suitable source. The large battery then provides a stable and steady d.c. source of power, which is completely free of all a.c. ripple. Thereafter, the small battery may be connected directly across part or all of the large battery. The charges in the two batteries equalize and come to the same level of charge. This way, the small battery is charged by a system seeking its own equilibrium, at its own timing. If one battery responds differently from another battery, the equalization proceeds at a different pace. The invention contemplates a plurality of voltage taps on the large battery so that any of many different potentials may be selected to match the need of either a single small battery or a plurality of the small batteries. Another feature of the invention places a number of diodes in series with the small battery to more precisely match the potential of the large battery to the potential requirements of the small battery. A set of contacts may short circuit at least some of these diodes in order to accommodate the drop in potential which occurs when an alternator which was previously running is stopped.

A preferred embodiment of the invention is shown in the attached drawing, in which:

FIG. 1 is a perspective view of a lead-acid battery, such as an automobile battery, with its cells indicated by dashed lines;

FIG. 2 is a schematic showing of one way of making a voltage tap to provide a specific one of many potential points which are available from this battery;

FIG. 3 is a perspective view of an alternative electrode for use in place of the electrode of FIG. 2;

FIG. 4 is a plan view showing the top of the battery of FIG. 1 and illustrating another way of obtaining any of a plurality of different potential points;

Figure 8:
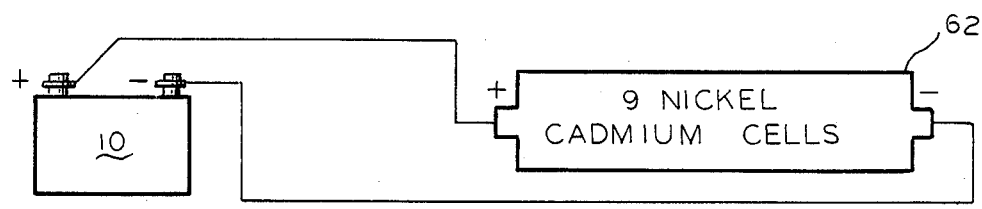
Figure 9:
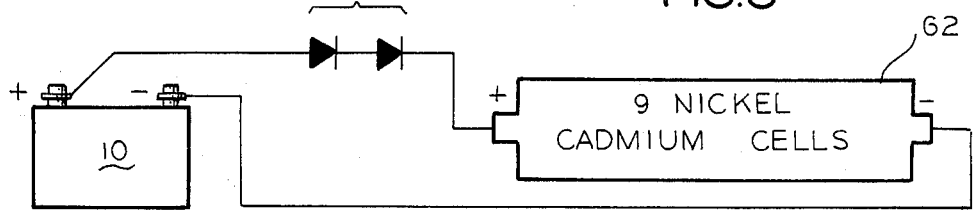
Figure 10:
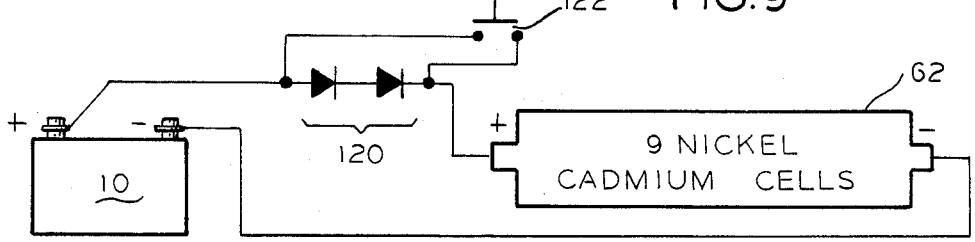
Figure 11:
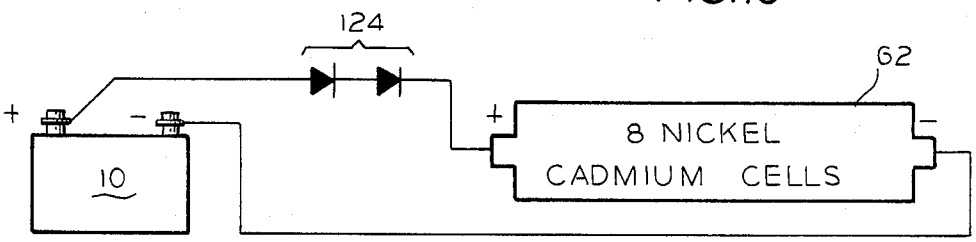
Figure 12:
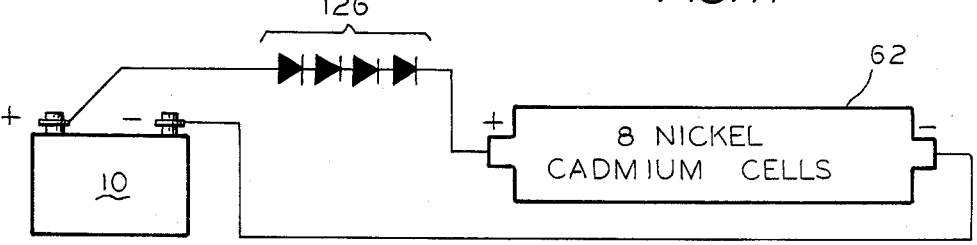
Figure 13:
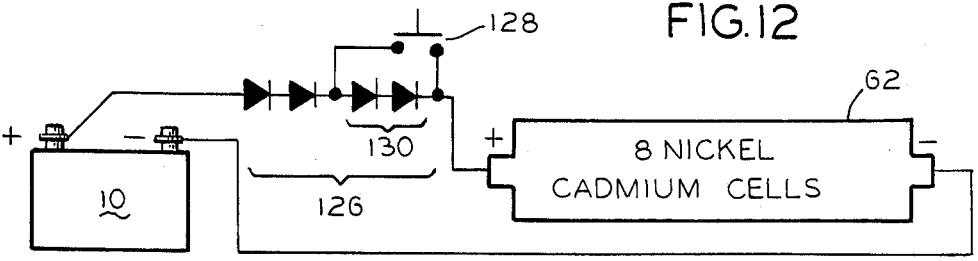

FIG. 5 graphically shows the various place where connections may be made to the battery in order to establish different potential points;

FIG. 6 illustrates one exemplary electric circuit for incorporating the invention in an automobile;

FIG. 7 is a cross sectional view of an exemplary small appliance incorporating the invention;

FIG. 8 schematically shows a circuit for charging a nine cell battery pack from a twelve volt battery with the alternator stopped;

FIG. 9 shows a circuit for the same nine cell battery pack with two diodes added to compensate for the increase in potential responsive to the output of the alternator;

FIG. 10 shows the circuit of FIG. 9 with contacts added to short circuit the two diodes when the alternator is stopped or to remove the short circuit when the alternator is running; and FIGS. 11–13 schematically show the same conditions that are shown in FIGS. 8–10, except with an embodiment using an eight cell battery pack.

By way of example, FIG. 1 shows a well known twelve volt automobile storage battery 10. The conventional positive and negative terminals 12, 14 may appear at any of several different points on the battery, depending upon the manufacturer's design. The battery has six cells 16-24, each producing about two volts so that there are approximately twelve volts across the terminals 12, 14.

Inside each cell there are a plurality of interleaved plates formed into sets by one set being joined at one end by a bus bar and the other set being joined at the opposite end by another bus bar. As shown at 26, 28, by way of example, each plate in one of the two sets of plates is connected to bus bar 26 and each plate in the other of the two sets is connected to the bus bar 28. Each of the bus bars 26, 28 extend over the ends of two adjacent cells in order to connect various cells in series. Therefore, each bus bar represents a point where a voltage tap may be made in order to pick off a specific voltage. For example, there is two volts (less any internal drop) across terminals 26, 28 and four volts (less any internal drop) across terminals 26, 30. Likewise, each of the cells 16-24 has a fill cap, as at 32, to enable water to be poured into the cell and gas to escape therefrom. Thus, there is a two-volt potential between voltages measured through the openings covered by any two adjacent fill caps, such as caps 32, 34, for example.

FIG. 2 shows how to make an electrical connection to the electrolyte in a single cell. A cap 36 is the same as the conventional cap 32, for example, except that a vent 38 is formed on a side to allow gas to escape from the cell. The center hole formally used as a vent receives a screw 40, which may be made of any electrically conductive material, such as brass, for example. This screw 40 attaches an electrode 42 to the bottom of the cap 36. The preferred metallurgical makeup of the electrolytic cathode 42 (or anode) material, is as follows:

All figures are approximate.

| | |
|---|---|
| Antimony | 5-5.25% |
| Iron (max.) | .005 |
| Bismuth | .01-.025 |
| Silver | .004 |
| Copper | .02-.04 |
| Tin | .3-.4 |
| Arsenic | .2-.3 |
| Sulphur | .004-.009 |
| Nickel | .001 |
| Zinc | .002 |

The balance of the electrode material is pure lead. While this is the preferred cathode (anode) material, it should be understood that the values are approximate and that a reasonable range of equivalents can be used.

When cap 36 is in place and properly seated on the battery, the electrode 42 depends far enough into electrolyte 44 to make a good electrical contact therewith. However, it does not depend far enough to make any electrical contact with the tops of the plates 46. Accordingly, any connection made to the screw 40 is at the potential of the electrolyte. This electrode 42 does not deteriorate from either the effects of the sulphuric acid, polarization or from electrolysis when used as the cathode or anode.

An alternative electrode 50 (FIG. 3) has a plurality of spaced apart fins to increase the surface area of the electrode which is in contact with the electrolyte 44. In some embodiments, it may be desirable to add, within the space defined by the fins, the active material which is used in the regular battery plates so that there is a battery action between the electrode 50 and at least some of the plates 46.

FIG. 4 illustrates how a plurality of voltage taps or potential points may be provided to give a spread of potential differences, which may be selected to match the voltage needs of a particular battery or group of batteries. In greater detail, FIG. 4 shows the top of the battery 10, with the same terminals 12, 14. A hole is formed in the top of the battery case over each of the internal bus bars (such as 26-30, etc. in FIG. 1). An upstanding bolt passes through this hole and turns into or otherwise makes good electrical contact with the underlying bus bar. A wing nut fits over that bolt to enable a wire to be easily connected thereto. For example, if a wire is placed under wing nut 52, it is in direct electrical contact with the bus bar 26 (FIG. 1) and there is a two volt potential, with respect to terminal 12. Likewise, wing nuts 54, 56 are in direct electrical contact with the bus bars 28, 30, respectively and there are two volt and six volt potentials with respect to terminal 12.

FIG. 5 graphically shows where and how cnnections may be made. A connection across the terminals A, B experience the full 12-volts available from the battery. Terminals C-H are connected into selected bus bars. Therefore, a connection between, say terminal C and terminal F has a potential equal to the sum of the potential of three cells 16-20. The electrodes (FIGS. 2 or 3) may be in any or all of the fill cap locations I-N.

The criteria for the selection of the correct terminals for making connections to charge small batteries should be apparent. In greater detail, each 1.2 V nickel cadmium battery cell requires a voltage of 1.4 V or more for it to be charged by the inventive method. The following voltage chart indicates the voltage requirements needed to recharge different numbers of secondary batteries or cells.

| NUMBER OF NI-CD CELLS | MINIMUM VOLTAGE REQUIRED | NUMBER OF NI-CD CELLS | MINIMUM VOLTAGE REQUIRED |
|---|---|---|---|
| 1 | 1.40V | 6 | 8.40V |
| 2 | 2.80V | 7 | 9.80V |
| 3 | 4.20V | 8 | 11.20V |
| 4 | 5.60V | 9 | 12.60V |
| 5 | 7.00V | 10 | 14.00V |

The following voltage chart indicates the potentials which are available from a conventional 12 V lead-acid automobile battery, using the inventive system, when the battery is charged (i.e. the batteries open circuit voltage between terminals A and B (FIG. 5) stands at 12.92 V.

| Positive Terminal A to: | Terminal | Negative Voltage | Terminal B to: | Terminal | Positive Voltage |
|---|---|---|---|---|---|
| | I | 1.84V | | N | 0.28V |
| | J | 4.00V | | M | 2.44V |
| | K | 6.16V | | L | 4.61V |
| | L | 8.31V | | K | 6.75V |
| | M | 10.47V | | J | 8.95V |
| | N | 12.64V | | I | 11.09V |

| Positive Terminal I to: | Terminal | Negative Voltage | Terminal J to: | Terminal | Positive Voltage |
|---|---|---|---|---|---|
| | J | 2.11V | | K | 2.07V |
| | K | 4.25V | | L | 4.24V |

| | | -continued | | |
|---|---|---|---|---|
| | L | 6.41V | M | 6.43V |
| | M | 8.52V | N | 8.59V |
| | N | 10.74V | | |
| Positive Terminal K to: | Terminal | Negative Voltage: | Terminal L to: Terminal | Positive Voltage |
| | L | 2.10V | M | 2.13V |
| | M | 4.27V | N | 2.17V |
| | N | 6.44V | | |

Different manufacturers produce batteries having different impedances which means that one manufacturer's set of eight batteries may terminate charging at 12.6 or 12.7 volts. Other manufacturer's batteries may need nine cells to terminate the charging at the same voltage.

The connections to the battery can be made through the cigarette lighter or a similar socket 60, when the selected voltage connection is to be made between normal battery terminals A and B which are the positive and negative posts of battery 10 (FIG. 6). If a battery pack 62 of eight or nine nickel-cadmium batteries are placed in series, they can be connected through the lighter to be recharged to full capacity, by using the inventive voltage equalization method. These eight, nine, or ten cells in battery pack 62 must be impedance balanced and each must be at substantially the same charge level. The charging rates will be found to be far in excess of current standards, with no ill effects upon the cells being recharged. (Terminals 64, 66 are spring clips for making electrical contact with the battery pack 62).

The principles of the invention should now be clear. The large battery contains a relatively high level of charge. The small and at least partially exhausted battery contains a relatively low level of charge and is connected across the selected terminals of the large battery. The relative levels of charge in the two batteries equalize so that both come to have the same relative level of charge. Thus, if the small battery is exhausted, it receives energy from the large battery until both batteries arrive at the same charge level. From the large battery, the small battery absorbs the energy at its natural charging rate of charge acceptance. There is no independently powered charger trying to overpower the small battery and to drive a charge into it, regardless of whether the charging rate is more or less than the battery can accept.

It has been found that, with the automobile alternator or charger inactive, nine small battery cells can be recharged in approximately six hours, or less, when connected in series to the large battery terminals A and B, if the voltage of the automobile battery stands at 12.6 volts, or more. These same nine cells can be recharged at a much faster rate when the alternator or charger is active. In a system actually built and tested, the recharging time was approximately one and one-half hours with the alternator active.

It has been found that no current limiting or charge terminating controls are needed. There does not appear to be a need for a diode to stop any current backflow. However, it is thought that it might be prudent to have a diode 68 in the circuit since the voltage in an automobile system may fluctuate responsive to the use of brake lights, radio, air conditioning, heating systems, head lights, etc. Also, some batteries may charge partially if the alternator is not operating and fully charge when the alternator is in operation. This unit has to be disconnected from the charging source before the engine is turned off. Therefore, it is an example of when a diode should be provided to stop any back flow of current if the cigarette lighter circuit, or the like, which is used to power the charger is not controlled by the ignition switch.

With the foregoing information, it is possible for almost anyone to recharge any suitable number, type and size of rechargeable batteries, especially nickel-cadmium and nickel-iron types of batteries.

There is no need to provide automatic controls for terminating the charging since the charge on the charging and charged batteries equalizes and then there is no potential difference to continue the charging process. On the other hand, it is always good to disconnect any electrical circuit when it is not in use. Therefore, FIG. 6 has been drawn with a current sensing relay 70 having make contacts 72 which are shunted by a non-lacking push-to-start button 74. After the push-to-start button is closed, relay 70 operates and holds itself via its own contacts 72. As long as a substantial current flows, relay 70 continues to hold itself operated. When the voltages equalize as the small batteries reach a full charge, current drops and relay 70 releases its contacts 72 to disconnect the charging circuit. This current sensing relay opens the charging circuit responsive to a drop in amperage in order to terminate charging.

In an optional usage, an ammeter 78 may be used to determine the amount of current in the battery pack 62 and, therefore, the state of the charge of the cells in battery pack 62.

In another optional usage, a voltage regulator 79 may be placed in the charging circuit to open the circuit after equilibrium is reached.

FIGS. 8-13 illustrate various conditions relating to charging batteries with the alternator operating or non-operating over unlimited periods of time. The existing literature states that the charging current applied to the battery pack 62 should be limited to 10% of the charged cell capacity, or about 180 MA for a size C cell rated at 1800 MA or 400 MA for a battery pack made up of size D cells rated at 4000 MA cell capacity. However, I have found that, when the charging voltage is in the range of 1.40-1.45 V per cell, the initial charging current may be as much as forty times greater than this recommended limit.

As will become more apparent, the invention uses one or more diodes, somewhat as small resistors, connected in series for matching the potential of the large battery 10 to the voltage needs of the small batteries pack 62. However, diodes have characteristics going far beyond the characteristics of resistors, per se. Therefore, when diodes are used, the results are spectacular as compared to the results when resistors, per se, are used. In one embodiment, the diode actually used had 0.9 volt drop on the forward voltage, although a variety of diodes with other forward voltage drops have been tested. It is presently thought that the diodes which are used should be in the general range of about a 0.8-0.9 volt drop.

First, a diode has a temperature characteristic which more nearly matches the charging needs of a nickel cardmium cell, as compared to the manner in which the characteristics of a pure resistor match those needs. Second, when the diodes are located in the general engine circuit, they tend to control and regulate battery potential. Not only is there less ripple, but more importantly, there are fewer wild spikes that might otherwise occur responsive to normal engine operation. These spikes could seriously damage the many electronic components which are found in modern automobiles, such as the computerized ignition, or the like.

One additional consideration is that there are substantial variations in the characteristics of commercially available diodes of a price quality that is normally used in engine and battery circuits, such as this. The same is true as to the characteristics of nickel cadmium cells. Therefore, the specific examples given in FIGS. 8-13 may vary in any given specific installation.

In the circuit of FIG. 8, it is assumed that battery pack 62 includes nine nickel cadmium cells connected in series. The engine is turned off and the alternator is not running. Therefore, the battery pack 62 is connected directly across the battery terminals, and no diodes are required.

In FIG. 9, it is assumed that the engine is running and that the alternator (not shown) is charging the battery. The incremental voltage increase introduced by the running alternator is offset by the voltage drop across two diodes 120 coupled in series with the battery pack 62. To combine the teachings of FIGS. 8, 9, a set of contacts 122 are connected in parallel with the diodes 120. These contacts are closed to bypass the diodes 120, when the engine and alternator are not running and are opened to insert the diodes when they are running.

The method of opening or closing the contacts 122 is not too material. These could be mechanical contacts which are closed and opened manually. Or, the contacts 122 could be on a relay which is operated when the engine ignition switch is closed or which is senstive to the current in the circuit including the battery pack 162. This way, the contacts 122 open when the current increases with the output of an alternator and close with the decrease in current. For example, relay 70 (FIG. 6), or voltage regulator 79, or contacts on ammeter 78, may control the short circuiting of diodes 120.

The principle shown in FIGS. 11-13 are substantially the same as those shown in FIGS. 8-10. If the battery pack has one less nickel cadmium cell (eight cells, as compared to the nine cells of FIGS. 8-10), the voltage difference is a The principle shown in FIGS. 11-13 are substantially the same as those shown in FIGS. 8-10. If the battery pack has one less nickel cadmium cell (eight cells, as compared to the nine cells of FIGS. 8-10), the voltage difference is accommodated by adding two diodes 124 in series with the battery pack. The voltage drops across the eight cell battery pack of FIG. 11, plus the two diodes 124, is equal to the voltage drop across the nine cells of the battery pack in FIG. 8.

Again, when the engine and alternator are running, the source potential increases. Therefore, when eight cells are used in a battery pack, four diodes 126 are added in series with the charging circuit. In order for the circuit of FIG. 12 to be used with eight cells while the engine and alternator are running, a switch 128 (FIG. 13) is closed across two, 130, of the four cells 126. Again, these contacts 128 may be operated manually or in response to voltage or current changes which occur while the engine is running. If the current is sensed in the series circuit including battery 10, battery pack 62, and diodes 130, the contacts 128 open when the batteries reach a sufficiently high level of charge.

The same principle may be extended to battery packs with many different numbers of cells and to battery packs connected to many different points on the battery. For example, four nickel-cadmium cells require 5.6 volts for charging. This pack may be connected across terminals J-N (FIG. 5) and be recharged with the engine/alternator inoperative, using no diodes, and with the engine/alternator operative, a diode is inserted into the circuit and will protect the cells from being overcharged.

FIG. 7 illustrates one of many practical applications of the invention to a small appliance, here shown in the form of a flashlight. A flashlight 80 has a plastic housing which contains a battery pack 82 containing eight nickel-cadmium batteris. Suitable spring contacts 84, 86 complete a circuit within the flashlight, including a push button 88 closed set of spring contacts 90 to light the lamp 89. Suitable terminals 92, 94 are embedded in the flashlight housing to extend connections to the outside surface of the flashlight housing. A reflector 91 and lens 93 complete the operative aspects of the flashlight. A handle 96 enables the flashlight to be picked up and carried about.

An adapter 100 is a second plastic housing which may be mounted, say, on the firewall of an automobile. Or, it could simply set on the floor or seat of the automobile. The adapter 100 contains a plastic housing preferably with a hood 101 which positively covers the push button 88 so that it cannot be pushed while the flashlight is in place in the adapter. Thus, the flashlight contacts 90 cannot close during a charging cycle.

Inside the plastic adapter housing 100, a pair of spring contacts 102, 104 make contact with the contacts 92, 94 which are built into the flashlight. These spring contacts are connected to a power cord 106 which leaves the housing through a strain relief grommet 108. The other end of cord 106 has a plug 110 which fits into a cigarette lighter, light bulb socket, or the like.

If there are less than eight cells in the battery pack 82, the plug 110 may be an odd size to fit a different kind of cigarette lighter, such as one which might be used on some foreign cars. The other side of this special lighter may be connected to any of the potential points A-N in FIG. 5.

Of course, the adapter 100 may also be permanently wired into the car if immediate availability of a fully charged flashlight is always necessary, as in a police car, fire engine, etc.

Also, if desired, the functions of both the flashlight and adapter may be combined into a flashlight which may be plugged directly into the electrical circuit of the automobile.

Those who are skilled in the art will readily perceive how to modify the invention. Therefore, the appended claims are to be construed to cover all equivalent structures which fall within the true scope and spirit of the invention.

The claimed invention is:

1. A battery charging system comprising a large lead-acid storage battery having at least two terminals with a potential therebetween, at least one small sealed nickel-cadmium battery which charges to a voltage which is slightly less than said potential, the energy stored in said large battery greatly exceeding the maximum energy that can be stored in said small battery, means for connecting said small battery into a circuit powered by the potential between said two terminals whereby the charge levels in said two batteries seek an equilibrium, the maximum amount of energy stored in said small battery after said equilibrium of charge levels is reached being such that virtually all of the energy previously stored in said large battery remains after said small battery is fully charged, said connecting means includes a plurality of diodes connected to limit the potential of said large battery as applied to said small battery, said limit being a level of about 1.40 to 1.45 volts per small battery cell, means connected across at least one of said series of diodes for shunting said one of said series of diodes, said shunting means being operated or not operated depending upon whether said large battery is or is not being charged and means for operating said shunting means responsive to the current or voltage level in said series circuit.

2. The system of claim 1 wherein said large battery has a plurality of voltage terminals giving different potentials, the potential differences between any selected two of said terminals being equal to the voltage required to charge a corresponding number of small batteries, whereby a plurality of said small batteries may be charged simultaneously by selecting two of the plurality of the voltage terminals having a potential difference between them corresponding to the charging requirements of the particular number of said small batteries.

3. The system of claim 1 wherein said large battery is a lead-acid battery having a plurality of cells, each cell having a fill cap, and electrode means depending from at least one fill cap far enough to make electrical contact with an electrolyte in the cell whereby said connecting means may be electrically connected to the cell via said electrode.

4. The system of claim 3 wherein a voltage regulator is used to step down the potential of said large battery to a level slightly above that of the battery being charged.

5. The system of claim 3 wherein said electrode is an alloy including lead.

6. The system of claim 5 wherein said electrode has a geometrical configuration which increases the area of electrode surface which makes contact between said electrode and said electrolyte.

7. The charger of claim 1 wherein said large battery is an automobile storage battery having positive and negative terminals and said small battery is a battery pack including at least eight nickel-cadmium cells, in series.

8. The charger of claim 1 and an ammeter coupled to indicate the level of current and indicate the level of charge in the small battery during said equalizing of the potentials of said two batteries.

9. The system of claim 1 and a combination flashlight consisting of a battery pack which can be used as a power source to operate electrical equipment and a light apparatus to be used as a flashlight.

10. The system of claim 9 wherein said flashlight is associated with an adapter for holding the flashlight when not in use, means for coupling said adapter to said large battery, and means associated with said flashlight and with said adapter which cooperate to charge said small battery whenever said light is held in said adapter.

11. The system of claim 3 wherein said electrode is an alloy including lead, described as:

| | |
|---|---|
| Antimony | 5–5.25% |
| Iron (max.) | .005 |
| Bismuth | .01–.025 |
| Silver | .004 |
| Copper | .02–.04 |
| Tin | .3–.4 |
| Arsenic | .2–.3 |
| Sulphur | .004–.009 |
| Nickel | .001 |
| Zinc | .002 | the balance of the electrode material being pure lead.

12. The system of claim 1 wherein said shunting means is operated or not operated depending upon whether said large battery is or is not being charged.

* * * * *

UNITED STATES PATENT AND TRADEMARK OFFICE
CERTIFICATE OF CORRECTION

PATENT NO. : 4,670,700
DATED : June 2, 1987
INVENTOR(S) : John R. Henkel

It is certified that error appears in the above-identified patent and that said Letters Patent is hereby corrected as shown below:

Col. 7, lines 40 through 44 have been deleted.

Signed and Sealed this

Twenty-sixth Day of January, 1988

Attest:

DONALD J. QUIGG

Attesting Officer    Commissioner of Patents and Trademarks